United States Patent
Liu et al.

(10) Patent No.: US 11,765,562 B2
(45) Date of Patent: Sep. 19, 2023

(54) SYSTEMS AND METHODS FOR MATCHING OBJECTS IN COLLABORATIVE PERCEPTION MESSAGES

(71) Applicant: Toyota Motor Engineering & Manufacturing North America, Inc., Plano, TX (US)

(72) Inventors: Hansi Liu, New Brunswick, NJ (US); Hongsheng Lu, San Jose, CA (US); Rui Guo, San Jose, CA (US)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 178 days.

(21) Appl. No.: 17/498,201

(22) Filed: Oct. 11, 2021

(65) Prior Publication Data
US 2023/0110132 A1    Apr. 13, 2023

(51) Int. Cl.
*H04W 4/46* (2018.01)
*H04W 4/12* (2009.01)

(52) U.S. Cl.
CPC ............. *H04W 4/46* (2018.02); *H04W 4/12* (2013.01)

(58) Field of Classification Search
CPC ........... H04W 4/40; H04W 4/46; H04W 4/38; H04W 4/44; H04W 4/023; G08G 1/161; G08G 1/0133; G08G 5/045

See application file for complete search history.

(56) References Cited

U.S. PATENT DOCUMENTS

| 9,117,235 | B2 | 8/2015 | Jebara et al. |
| 2021/0067926 | A1 | 3/2021 | Hwang et al. |
| 2021/0149417 | A1* | 5/2021 | Koch ................. G05D 1/0088 |
| 2023/0017247 | A1* | 1/2023 | Hwang .................. G01S 19/07 |

FOREIGN PATENT DOCUMENTS

| CN | 104065932 | B |   | 8/2019 |           |
| CN | 111460922 | A |   | 7/2020 |           |
| CN | 111708856 | A | * | 9/2020 | ........... G06F 16/29 |
| CN | 111914664 | A | * | 11/2020 |           |
| CN | 111914664 | A |   | 11/2020 |           |

(Continued)

OTHER PUBLICATIONS

Gokulnath, "Generation of Cooperative Perception Messages for Connected and Automated Vehicles", IEEE Transactions on Vehicular Technology, Nov. 2020 (Year: 2020).*

(Continued)

*Primary Examiner* — Dung Hong
(74) *Attorney, Agent, or Firm* — Dinsmore & Shohl LLP (57) ABSTRACT

A method of matching objects in collaborative perception messages is provided. The method includes obtaining a first collaborative perception message (CPM) message from a first node, obtaining a second CPM from a second node, calculating an adaptive threshold based on uncertainty of the first CPM and uncertainty of the second CPM, calculating scores for pairs of objects, each of the pairs of objects including one object in the first CPM and one object in the second CPM, filtering out one or more pairs whose score is greater than the adaptive threshold to obtain a filtered matrix; and implementing a fusion algorithm on the filtered matrix to obtain correspondence identification among objects.

20 Claims, 6 Drawing Sheets

(56) References Cited

FOREIGN PATENT DOCUMENTS

| | | | | |
|---|---|---|---|---|
| CN | 111652912 B | | 2/2021 | |
| CN | 112509032 A | | 3/2021 | |
| CN | 111145545 B | | 5/2021 | |
| CN | 113433548 A | * | 9/2021 | |
| EP | 3739356 A1 | | 11/2020 | |
| JP | 2020113272 A | * | 7/2020 | ............. G06N 20/00 |
| WO | 2021141448 A1 | | 7/2021 | |
| WO | WO-2021141770 A1 | * | 7/2021 | ........... G06K 9/6222 |

OTHER PUBLICATIONS

Schiegg et al., "Collective Perception: A Safety Perspective" (Year: 2020).*

Peng Gao, et al.; "Bayesian Deep Graph Matching for Correspondence Identification in Collaborative Perception"; Journal Robotics: Science and Systems 2021, Jul. 12, 2021; Virtual Seminar; URL:http://www.roboticsproceedings.org/rss17/p022.pdf.

Peng Gao, et al.; "Regularized Graph Matching for Correspondence Identification under Uncertainty in Collaborative Perception"; Journal Robotics: Science and Systems 2020, Jul. 12, 2020; Corvalis, Oregon, USA; URL:http://www.roboticsproceedings.org/rss16/p012.pdf.

* cited by examiner

SYSTEMS AND METHODS FOR MATCHING OBJECTS IN COLLABORATIVE PERCEPTION MESSAGES

TECHNICAL FIELD

The present disclosure relates to systems and methods for matching objects in collaborative perception messages.

BACKGROUND

Vehicles communicate messages such as basic safety messages (BSMs), collaborative perception messages (CPMs), personal safety messages (PSMs) via vehicle to vehicle communication (V2V) or vehicle to everything communication (V2X). These messages may be used to augment a vehicle's local dynamic map to support various onboard applications, e.g., collision avoidance, navigation, etc. When a vehicle receives multiple messages from multiple vehicles and generates a local dynamic map based on the received messages, it is difficult to identify the same object in the multiple messages because of uncertainty of the location of the object.

Accordingly, a need exists for systems and methods for accurately identifying correspondence among objects in multiple messages.

SUMMARY

The present disclosure provides systems and methods for matching objects in messages received from multiple vehicles, such as collaborative perception messages.

In one embodiment, a method of matching objects in collaborative perception messages is provided. The method includes obtaining a first collaborative perception message (CPM) message from a first node, obtaining a second CPM from a second node, calculating an adaptive threshold based on uncertainty of the first CPM and uncertainty of the second CPM, calculating scores for pairs of objects, each of the pairs of objects including one object in the first CPM and one object in the second CPM, filtering out one or more pairs whose score is greater than the adaptive threshold to obtain a filtered matrix; and implementing a fusion algorithm on the filtered matrix to obtain correspondence identification among objects.

In another embodiment, a vehicle includes a network interface and a controller. The network interface is configured to: receive a first collaborative perception message (CPM) message from a first node; and receive a second CPM from a second node. The controller is programmed to: calculate an adaptive threshold based on uncertainty of the first CPM and uncertainty of the second CPM, calculate scores for pairs of objects, each of the pairs of objects including one object in the first CPM and one object in the second CPM, filter out one or more pairs whose score is greater than the adaptive threshold to obtain a filtered matrix, and implement a fusion algorithm on the filtered matrix to obtain correspondence identification among objects.

In another embodiment, a non-transitory computer readable medium storing instructions is provided. The instructions, when executed by a processor, perform operations including obtaining a first collaborative perception message (CPM) message from a first node, obtaining a second CPM from a second node, calculating an adaptive threshold based on uncertainty of the first CPM and uncertainty of the second CPM, calculating scores for pairs of objects, each of the pairs of objects including one object in the first CPM and one object in the second CPM, filtering out one or more pairs whose score is greater than the adaptive threshold to obtain a filtered matrix, and implementing a fusion algorithm on the filtered matrix to obtain correspondence identification among objects.

These and additional features provided by the embodiments of the present disclosure will be more fully understood in view of the following detailed description, in conjunction with the drawings.

BRIEF DESCRIPTION OF THE DRAWINGS

The embodiments set forth in the drawings are illustrative and exemplary in nature and not intended to limit the disclosure. The following detailed description of the illustrative embodiments can be understood when read in conjunction with the following drawings, where like structure is indicated with like reference numerals and in which.

DETAILED DESCRIPTION

The embodiments disclosed herein include systems and methods for identifying correspondence among objects specified in messages such as collaborative perception messages. A method includes obtaining a first collaborative perception message (CPM) message from a first node, obtaining a second CPM from a second node, calculating an adaptive threshold based on uncertainty of the first CPM and uncertainty of the second CPM, calculating scores for pairs of objects, each of the pairs of objects including one object in the first CPM and one object in the second CPM, filtering out one or more pairs whose score is greater than the adaptive threshold to obtain a filtered matrix, and implementing a fusion algorithm on the filtered matrix to obtain correspondence identification among objects.

Updating a local dynamic map may be implemented by stacking up incoming objects included in messages from other vehicles onto a current map. However, the messages from other vehicles, e.g., DSRC V2X messages, include noises, the observations of objects reported in the messages retain uncertainties. The uncertainties make difficult to accurately determine whether two objects reported in different messages are the same object or not. The present disclosure calculates an adaptive threshold based on the uncertainties of the messages. The adaptive threshold may be used to filter out false positives of matching pairs.

Figure 1A:
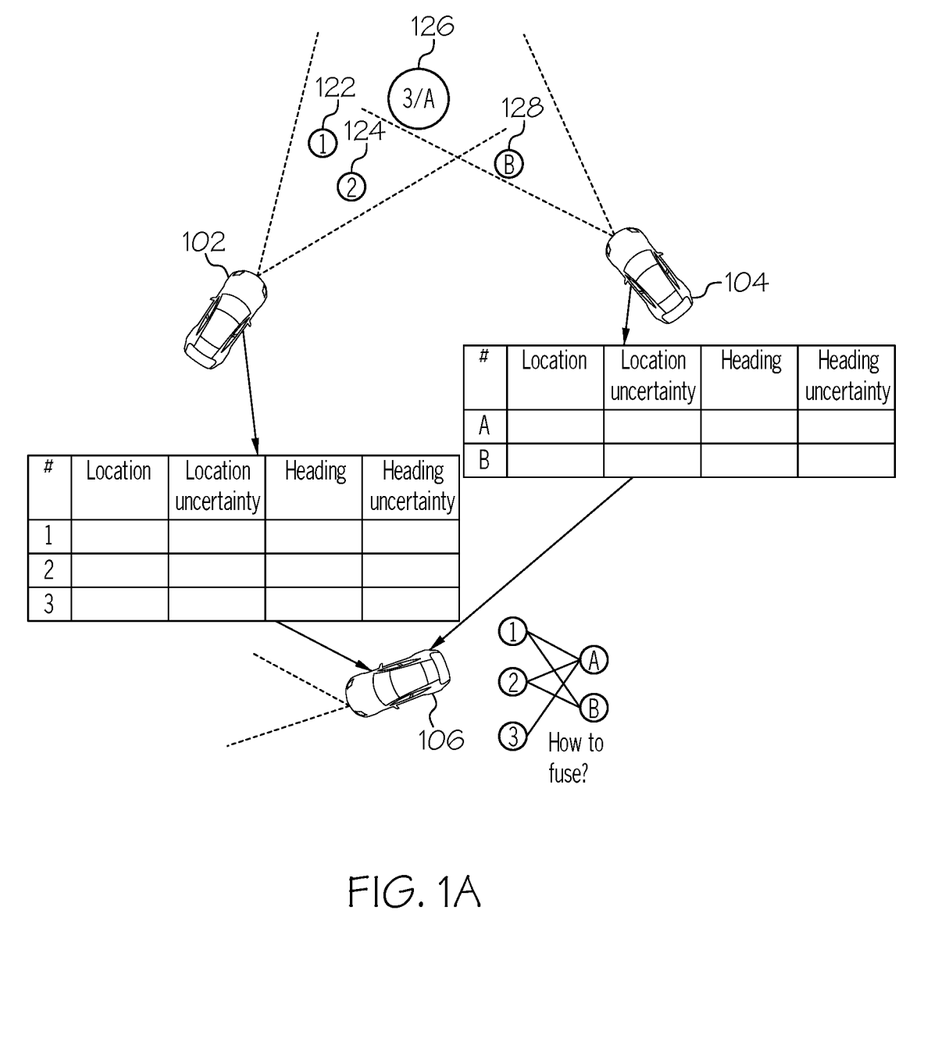
FIG. 1A schematically depicts a system for identifying correspondence among objects that are included in collaborative perception messages, in accordance with one or more embodiments shown and described herewith.

FIG. 1A schematically depicts a system for identifying correspondence among objects that are included in collaborative perception messages, in accordance with one or more embodiments shown and described herewith.

By referring to FIG. 1A, a vehicle 106 receives messages from a vehicle 102 and a vehicle 104. Each of the vehicles 102, 104, 106 may be an automobile or any other passenger or non-passenger vehicle such as, for example, a terrestrial, aquatic, and/or airborne vehicle. In some embodiments, the vehicle is an autonomous vehicle that navigates its environment with limited human input or without human input. The messages may be collaborative perception messages (CPMs). In some embodiments, the messages may be other type of messages including, but not limited to, basic safety messages (BSMs), personal safety messages (PSMs), etc.

The vehicle 102 may sense objects 122, 124, and 126 using its sensors, for example, LIDAR sensors, radar sensors, sonar sensors, or other types of sensors. Based on the sensed information, the vehicle 102 may generate a first CPM that includes locations of the objects 122, 124, and 126. The first CPM may also include the headings of the objects 122, 124, and 126. Then, the vehicle 102 transmits the first CPM to the vehicle 106. The vehicle 102 may also transmit the location and/or heading of the vehicle 102 to the vehicle 106. Similarly, the vehicle 104 may sense objects 126 and 128 using its sensors, for example, LIDAR sensors, radar sensors, sonar sensors, or other types of sensors. Based on the sensed information, the vehicle 104 may generate a second CPM that includes locations of the objects 126 and 128. The second CPM may also include the headings of the objects 126 and 128. Then, the vehicle 104 transmits the second CPM to the vehicle 106. The vehicle may also transmit the location and/or heading of the vehicle 104 to the vehicle 106. The vehicle 106 may match objects included in the first CPM with objects included in the second CPM using a fusion algorithm. In embodiments, the vehicle 106 may use a bipartite graph, i.e., a Hungarian algorithm, with feature differences to match a pair of objects. In this example, the vehicle 106 may match the object 126 identified by the vehicle 102 with the object 126 identified by the vehicle 104.

Figure 1B:
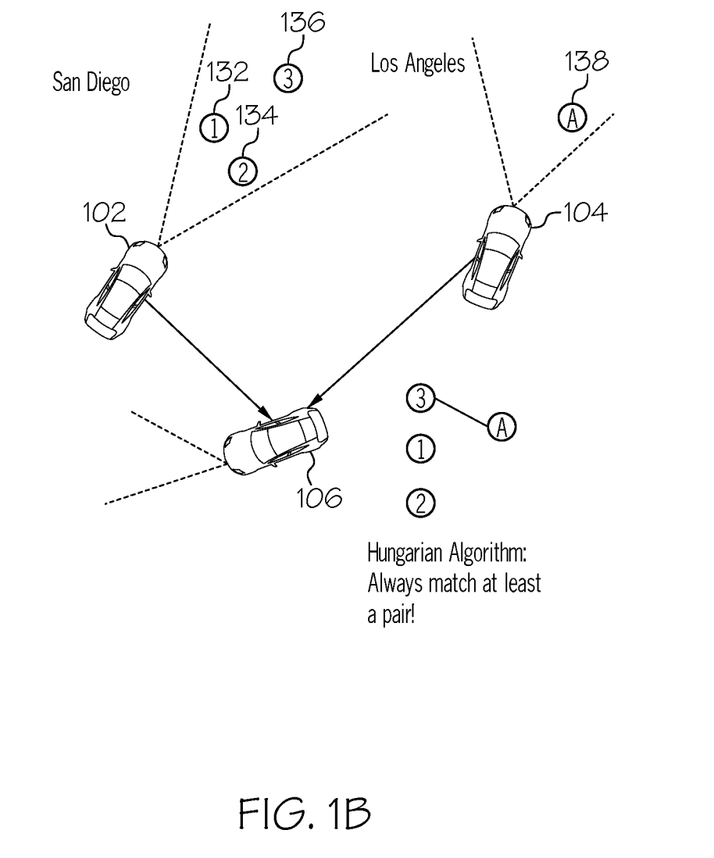
FIG. 1B schematically depicts a system for identifying correspondence among objects that are included in collaborative perception messages, in accordance with one or more embodiments shown and described herewith.

The issue of using the Hungarian algorithm is that the Hungarian algorithm always tries to match at least a pair of objects even if a pair of objects are at drastically different locations as illustrated in FIG. 1B. By referring to FIG. 1B, the vehicle 102 may sense objects 132, 134, 136 using its sensors. Based on the sensed information, the vehicle 102 may generate a first CPM that includes locations of the objects 132, 134, 136. Then, the vehicle 102 transmits the first CPM to the vehicle 106. The vehicle 102 may also transmit the location and/or heading of the vehicle 102 to the vehicle 106. Similarly, the vehicle 104 may sense an object 138 using its sensors. Based on the sensed information, the vehicle 104 may generate a second CPM that includes the location of the object 138. Then, the vehicle 104 transmits the second CPM to the vehicle 106. The vehicle may also transmit the location and/or heading of the vehicle 104 to the vehicle 106. In contrast with the example of FIG. 1A, in this example, the vehicle 102 and the vehicle 104 are located far from each other. For example, the vehicle 102 is located in San Diego, and the vehicle 104 is located in Los Angeles. Since the vehicles 102 and 104 are located far from each other, no matching should be made between the objects identified by the vehicle 102 and the objects identified by the vehicle 104. However, the Hungarian algorithm always matches at least one pair. Thus, in this example, the vehicle 106 may erroneously match the object 136 with the object 138 even though the object 136 is clearly different from the object 138. Thus, the present disclosure prunes any match that is likely to be false using an adaptive threshold that is generated based on uncertainties of data, e.g., uncertainties of locations of detected objects, and uncertainties of locations of vehicles. The details of calculating an adaptive threshold will be described in detail below.

Figure 2:
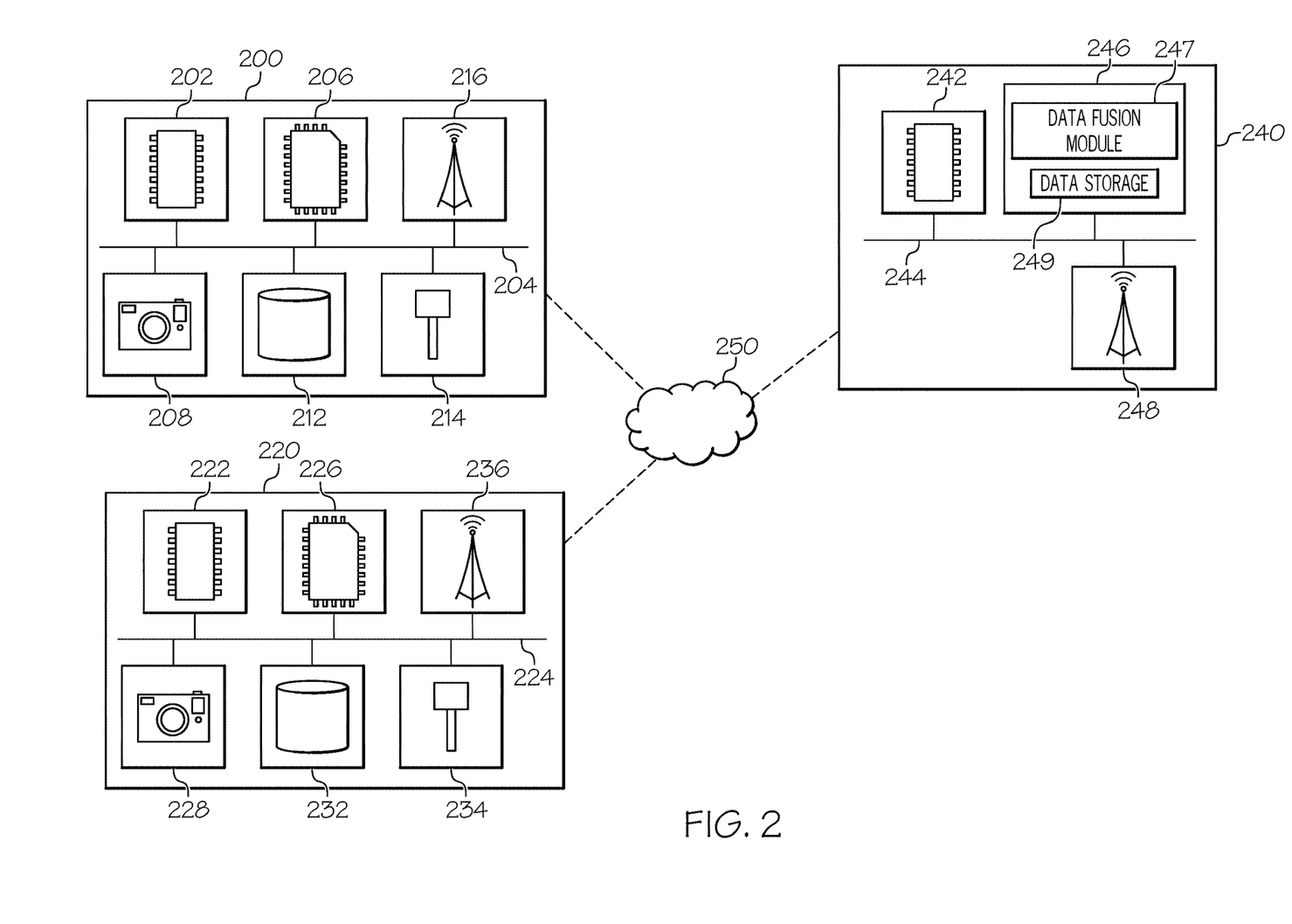
FIG. 2 depicts a schematic diagram of a system for fusing data in CPMs using an adaptive threshold, according to one or more embodiments shown and described herein.

FIG. 2 depicts a schematic diagram of a system for fusing data in CPMs using an adaptive threshold, according to one or more embodiments shown and described herein. The system includes a first vehicle system 200, a second vehicle system 220, and an edge system 240. While FIG. 2 depicts that two vehicle systems communicate with the edge system 240, more than two vehicle systems may communicate with the edge system 240.

It is noted that, while the first vehicle system 200 and the second vehicle system 220 are depicted in isolation, each of the first vehicle system 200 and the second vehicle system 220 may be included within an edge node such as a vehicle in some embodiments, for example, respectively within the vehicles 102 and 104 of FIGS. 1A and 1B. Similarly, the edge system 240 may be included within the vehicle 106 of FIGS. 1A and 1B. Alternatively, the edge system 240 may be included within an edge server or a road side unit that communicates with the vehicles 102 and 104. In embodiments in which each of the first vehicle system 200 and the second vehicle system 220 is included within an edge node, the edge node may be an automobile or any other passenger or non-passenger vehicle such as, for example, a terrestrial, aquatic, and/or airborne vehicle. In some embodiments, the vehicle is an autonomous vehicle that navigates its environment with limited human input or without human input. In some embodiments, the edge node may be an edge server that communicates with a plurality of vehicles in a region and communicates with another vehicle, such as the vehicle 106. In some embodiments, The first vehicle system 200 includes one or more processors 202. Each of the one or more processors 202 may be any device capable of executing machine readable and executable instructions. Accordingly, each of the one or more processors 202 may be a controller, an integrated circuit, a microchip, a computer, or any other computing device. The one or more processors 202 are coupled to a communication path 204 that provides signal interconnectivity between various modules of the system. Accordingly, the communication path 204 may communicatively couple any number of processors 202 with one another, and allow the modules coupled to the communication path 204 to operate in a distributed computing environment. Specifically, each of the modules may operate as a node that may send and/or receive data. As used herein, the term "communicatively coupled" means that coupled components are capable of exchanging data signals with one another such as, for example, electrical signals via conductive medium, electromagnetic signals via air, optical signals via optical waveguides, and the like.

Accordingly, the communication path 204 may be formed from any medium that is capable of transmitting a signal such as, for example, conductive wires, conductive traces, optical waveguides, or the like. In some embodiments, the communication path 204 may facilitate the transmission of wireless signals, such as WiFi, Bluetooth®, Near Field Communication (NFC), and the like. Moreover, the communication path 204 may be formed from a combination of mediums capable of transmitting signals. In one embodiment, the communication path 204 comprises a combination of conductive traces, conductive wires, connectors, and buses that cooperate to permit the transmission of electrical data signals to components such as processors, memories, sensors, input devices, output devices, and communication devices. Accordingly, the communication path 204 may comprise a vehicle bus, such as for example a LIN bus, a CAN bus, a VAN bus, and the like. Additionally, it is noted that the term "signal" means a waveform (e.g., electrical, optical, magnetic, mechanical or electromagnetic), such as DC, AC, sinusoidal-wave, triangular-wave, square-wave, vibration, and the like, capable of traveling through a medium.

The first vehicle system 200 includes one or more memory modules 206 coupled to the communication path 204. The one or more memory modules 206 may comprise RAM, ROM, flash memories, hard drives, or any device capable of storing machine readable and executable instructions such that the machine readable and executable instructions can be accessed by the one or more processors 202. The machine readable and executable instructions may comprise logic or algorithm(s) written in any programming language of any generation (e.g., 1GL, 2GL, 3GL, 4GL, or 5GL) such as, for example, machine language that may be directly executed by the processor, or assembly language, object-oriented programming (OOP), scripting languages, microcode, etc., that may be compiled or assembled into machine readable and executable instructions and stored on the one or more memory modules 206. Alternatively, the machine readable and executable instructions may be written in a hardware description language (HDL), such as logic implemented via either a field-programmable gate array (FPGA) configuration or an application-specific integrated circuit (ASIC), or their equivalents. Accordingly, the methods described herein may be implemented in any conventional computer programming language, as pre-programmed hardware elements, or as a combination of hardware and software components. The one or more processor 202 along with the one or more memory modules 206 may operate as a controller for the first vehicle system 200.

Referring still to FIG. 2, the first vehicle system 200 comprises one or more sensors 208. The one or more sensors 208 may be any device having an array of sensing devices capable of detecting radiation in an ultraviolet wavelength band, a visible light wavelength band, or an infrared wavelength band. The one or more sensors 208 may have any resolution. In some embodiments, one or more optical components, such as a mirror, fish-eye lens, or any other type of lens may be optically coupled to the one or more sensors 208. In embodiments described herein, the one or more sensors 208 may provide image data to the one or more processors 202 or another component communicatively coupled to the communication path 204. In some embodiments, the one or more sensors 208 may also provide navigation support. That is, data captured by the one or more sensors 208 may be used to autonomously or semi-autonomously navigate a vehicle.

In some embodiments, the one or more sensors 208 include one or more imaging sensors configured to operate in the visual and/or infrared spectrum to sense visual and/or infrared light. Additionally, while the particular embodiments described herein are described with respect to hardware for sensing light in the visual and/or infrared spectrum, it is to be understood that other types of sensors are contemplated. For example, the systems described herein could include one or more LIDAR sensors, radar sensors, sonar sensors, or other types of sensors for gathering data that could be integrated into or supplement the data collection described herein. Ranging sensors like radar may be used to obtain a rough depth and speed information for the view of the first vehicle system 200.

The first vehicle system 200 comprises a satellite antenna 214 coupled to the communication path 204 such that the communication path 204 communicatively couples the satellite antenna 214 to other modules of the first vehicle system 200. The satellite antenna 214 is configured to receive signals from global positioning system satellites. Specifically, in one embodiment, the satellite antenna 214 includes one or more conductive elements that interact with electromagnetic signals transmitted by global positioning system satellites. The received signal is transformed into a data signal indicative of the location (e.g., latitude and longitude) of the satellite antenna 214 or an object positioned near the satellite antenna 214, by the one or more processors 202.

The first vehicle system 200 comprises one or more vehicle sensors 212. Each of the one or more vehicle sensors 212 is coupled to the communication path 204 and communicatively coupled to the one or more processors 202. The one or more vehicle sensors 212 may include one or more motion sensors for detecting and measuring motion and changes in motion of a vehicle, e.g., the edge node 101. The motion sensors may include inertial measurement units. Each of the one or more motion sensors may include one or more accelerometers and one or more gyroscopes. Each of the one or more motion sensors transforms sensed physical movement of the vehicle into a signal indicative of an orientation, a rotation, a velocity, or an acceleration of the vehicle.

Still referring to FIG. 2, the first vehicle system 200 comprises network interface hardware 216 for communicatively coupling the first vehicle system 200 to the second vehicle system 220 and/or the edge system 240. The network interface hardware 216 can be communicatively coupled to the communication path 204 and can be any device capable of transmitting and/or receiving data via a network. Accordingly, the network interface hardware 216 can include a communication transceiver for sending and/or receiving any wired or wireless communication. For example, the network interface hardware 216 may include an antenna, a modem, LAN port, WiFi card, WiMAX card, mobile communications hardware, near-field communication hardware, satellite communication hardware and/or any wired or wireless hardware for communicating with other networks and/or devices. In one embodiment, the network interface hardware 216 includes hardware configured to operate in accordance with the Bluetooth® wireless communication protocol. The network interface hardware 216 of the first vehicle system 200 may transmit its data to the second vehicle system 220 or the edge system 240. For example, the network interface hardware 216 of the first vehicle system 200 may transmit messages such as BSMs, CPMs, PSMs to the edge system 240.

The first vehicle system 200 may connect with one or more external vehicle systems (e.g., the second vehicle system 220) and/or external processing devices (e.g., the edge system 240) via a direct connection. The direct connection may be a vehicle-to-vehicle connection ("V2V connection"), a vehicle-to-everything connection ("V2X connection"), or a mmWave connection. The V2V or V2X connection or mmWave connection may be established using any suitable wireless communication protocols discussed above. A connection between vehicles may utilize sessions that are time-based and/or location-based. In embodiments, a connection between vehicles or between a vehicle and an infrastructure element may utilize one or more networks to connect, which may be in lieu of, or in addition to, a direct connection (such as V2V, V2X, mmWave) between the vehicles or between a vehicle and an infrastructure. By way of non-limiting example, vehicles may function as infrastructure nodes to form a mesh network and connect dynamically on an ad-hoc basis. In this way, vehicles may enter and/or leave the network at will, such that the mesh network may self-organize and self-modify over time. Other non-limiting network examples include vehicles forming peer-to-peer networks with other vehicles or utilizing centralized networks that rely upon certain vehicles and/or infrastructure elements. Still other examples include networks using centralized servers and other central computing devices to store and/or relay information between vehicles.

Still referring to FIG. 2, the first vehicle system 200 may be communicatively coupled to the edge system 240 by the network 250. In one embodiment, the network 250 may include one or more computer networks (e.g., a personal area network, a local area network, or a wide area network), cellular networks, satellite networks and/or a global positioning system and combinations thereof. Accordingly, the first vehicle system 200 can be communicatively coupled to the network 250 via a wide area network, via a local area network, via a personal area network, via a cellular network, via a satellite network, etc. Suitable local area networks may include wired Ethernet and/or wireless technologies such as, for example, Wi-Fi. Suitable personal area networks may include wireless technologies such as, for example, IrDA, Bluetooth®, Wireless USB, Z-Wave, ZigBee, and/or other near field communication protocols. Suitable cellular networks include, but are not limited to, technologies such as LTE, WiMAX, UMTS, CDMA, and GSM.

Still referring to FIG. 2, the second vehicle system 220 includes one or more processors 222, one or more memory modules 226, one or more sensors 228, one or more vehicle sensors 232, a satellite antenna 234, and a communication path 224 communicatively connected to the other components of the second vehicle system 220. The components of the second vehicle system 220 may be structurally similar to and have similar functions as the corresponding components of the first vehicle system 200 (e.g., the one or more processors 222 corresponds to the one or more processors 202, the one or more memory modules 226 corresponds to the one or more memory modules 206, the one or more sensors 228 corresponds to the one or more sensors 208, the one or more vehicle sensors 232 corresponds to the one or more vehicle sensors 212, the satellite antenna 234 corresponds to the satellite antenna 214, the communication path 224 corresponds to the communication path 204, and the network interface hardware 236 corresponds to the network interface hardware 216).

Still referring to FIG. 2, the edge system 240 includes one or more processors 242, one or more memory modules 246, network interface hardware 248, and a communication path 244. The one or more processors 242 may be a controller, an integrated circuit, a microchip, a computer, or any other computing device. The one or more memory modules 246 may comprise RAM, ROM, flash memories, hard drives, or any device capable of storing machine readable and executable instructions such that the machine readable and executable instructions can be accessed by the one or more processors 242. The one or more memory modules 246 may include a data fusion module 247 and a data storage 249.

The data fusion module 247 determines association among objects in CPMs received from vehicles, e.g., from the first vehicle system 200 and the second vehicle system 220, using an adaptive threshold value. The data fusion module 247 may calculate the adaptive threshold using a trained mapping function f( ). Training of a mapping function f( ) may be implemented using machine learning algorithms such as a linear model, a logistic regression model, and a neural network model.

The mapping function f( ) receives uncertainties of CPMs as inputs and outputs a threshold, e.g., a distance threshold. The uncertainties of CPMs may include uncertainties of locations of vehicles that transmitted the CPMs and uncertainties of locations of objects detected by the vehicles. The uncertainties of the locations of the vehicles and the uncertainties of the locations of the objects may be represented as covariance matrices. When the training is implemented by a linear model, the training uses the following equation.

$$f(A)=b \qquad \text{Equation 1}$$

A represents uncertainties of CPMs, e.g., covariance matrices of locations of vehicles and covariance matrices of locations of detected objects. f( ) is a mapping function that outputs a distance threshold $b^{pred}$ based on the input A. Here $b^{pred}$ is a predicted distance threshold for determining whether two objects are the same object or not. For example, if the distance between two objects in two different CPMs is less than the predicted distance threshold, then it is determined that the two objects are the same object. The training of f( ) may be implemented by comparing a ground truth threshold $b^{GND}$ and the predictive distance threshold $b^{pred}$. The ground truth threshold is a threshold distance that is used to accurately determine whether two objects are the same objects or not. The training of f( ) may be implemented until the prediction error of norm ($b^{pred}-b^{GND}$) is less than a predetermined value. While the training may be implemented in the edge system 240, the training of the mapping function may be implemented by other entity, for example, a cloud server, and the cloud server may transmit the trained mapping function to the edge system 240.

Then, the data fusion module 247 may use the trained mapping function f( ) to determine an adaptive threshold based on real time inputs. For example, by referring to FIG. 1B, the data fusion module 247 receive a first CPM from the first vehicle 102 and a second CPM from the second vehicle 104. The first CPM may include the location of the first vehicle 102 and the locations of the detected objects 132, 134, 136. Similarly, the second CPM may include the location of the second vehicle 104 and the location of the detected object 138. The data fusion module 247 may obtain uncertainties of the locations of the first vehicle 102 and the objects 132, 134, 136. For example, the uncertainties may be covariance matrices for the locations of the first vehicle 102 and the objects 132, 134, 136. Similarly, the second CPM may include the location of the second vehicle 104 and the location of the detected object 138. Similarly, the second CPM may include the location of the second vehicle 104 and the location of the detected object 138. The data fusion module 247 may obtain uncertainties of the locations of the second vehicle 104 and the object 138. For example, the uncertainties may be covariance matrices for the locations of the second vehicle 104 and the object 138. Then, the data fusion module 247 input the covariance matrices for the locations of the first vehicle 102 and the objects 132, 134, 136 and the covariance matrices for the locations of the second vehicle 104 and the object 138 to the trained mapping function f( ). In response, the trained mapping function f( ) outputs an adaptive threshold distance b.

The data fusion module 247 obtains a score matrix that includes scores representing distances between pairs of objects in CPMs. By referring to FIG. 1B, the data fusion module 247 may transform the covariance matrices of the locations of the objects 132, 134, 136 into detections in the coordinates of the ego vehicle 106. Similarly, the data fusion module 247 may transform the covariance matrix of the location of the object 138 into detection in the coordinates of the ego vehicle 106. Then, the data fusion module 247 obtains a score matrix including scores for pairs of detected objects. For example, the score matrix may include a score for a pair of the object 132 and the object 138, a score for a pair of the object 134 and the object 138, a score for a pair of the object 136 and the object 138. The score may represent a distance between two objects. Then, the data fusion module 247 may compare the scores of the score matrix with the adaptive threshold distance b to filter out pairs of objects. In this case, all three scores of the score matrix are bigger than the adaptive threshold because the objects 132, 134, 136 are located far from the object 138 and the adaptive threshold distance is set to be relatively small to identify two different objects that are relatively close to each other. Accordingly, the data fusion module 247 may determine that there is no corresponding between a group of the objects 132, 134, 136 and the object 138.

The data storage 249 may store CPMs received from other systems and the trained mapping function f( ).

Figure 3:
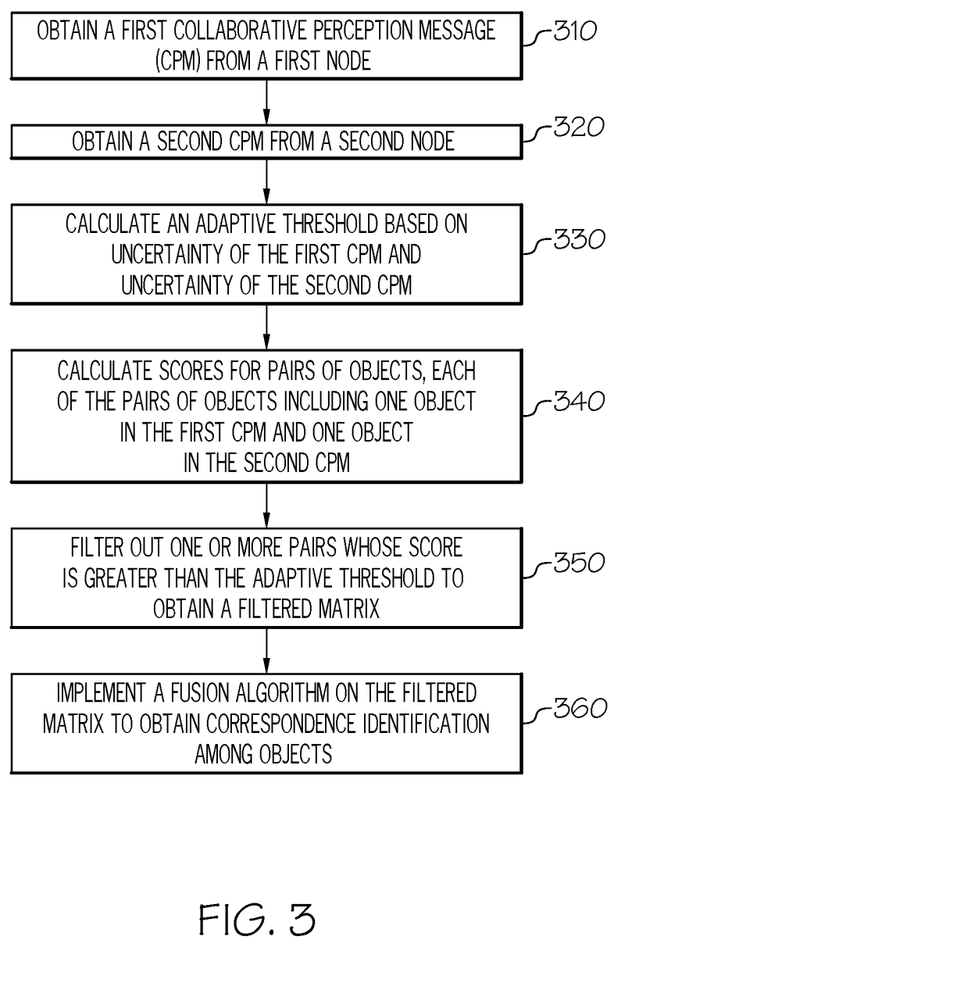
FIG. 3 depicts a flowchart for determining correspondence among objects in CPMs using an adaptive threshold, according to one or more embodiments shown and described herein.

FIG. 3 depicts a flowchart for determining correspondence among objects in CPMs using an adaptive threshold, according to one or more embodiments shown and described herein.

In step 310, an edge node obtains a first collaborative perception message (CPM) from a first node. By referring to FIG. 5, the edge node may be the vehicle 106 and the first node may be the vehicle 102. The vehicle 106 receives a first CPM from the vehicle 102. The first CPM includes the location of the vehicle 102 and the locations of the detected objects 502, 504, 506. The locations of the vehicle 102 and the detected objects 502, 504, 506 may not be exact locations due to noises, calculation errors, or low resolution of sensors. Thus, uncertainties of the locations of the detected objects 502, 504, 506 may be represented as covariance matrices.

Referring back to FIG. 3, in step 320, the edge node obtains a second collaborative perception message (CPM) from a second node. By referring to FIG. 5, the vehicle 106 receives a second CPM from the vehicle 104. The second CPM includes locations of the vehicle 104 and the detected objects 512, 514, 516. The locations of the location of the vehicle 104 and the detected objects 512, 514, 516 may not be exact locations due to noises, calculation errors, or low resolution of sensors. Thus, uncertainties of the locations of the detected objects 512, 514, 516 may be represented as covariance matrices.

Referring back to FIG. 3, in step 330, the edge node calculates an adaptive threshold based on the uncertainty of the first CPM and the uncertainty of the second CPM. In embodiments, by referring to FIGS. 2 and 5, the data fusion module 247 of the vehicle 106 may calculate an adaptive threshold based on the uncertainty of the first CPM from the vehicle 102 and the uncertainty of the second CPM form the vehicle 104. Specifically, by referring to equation 1 above, the data fusion module 247 inputs the uncertainty of the first CPM and the uncertainty of the second CPM to the trained mapping function f( ), which outputs an adaptive threshold b.

Figure 5:
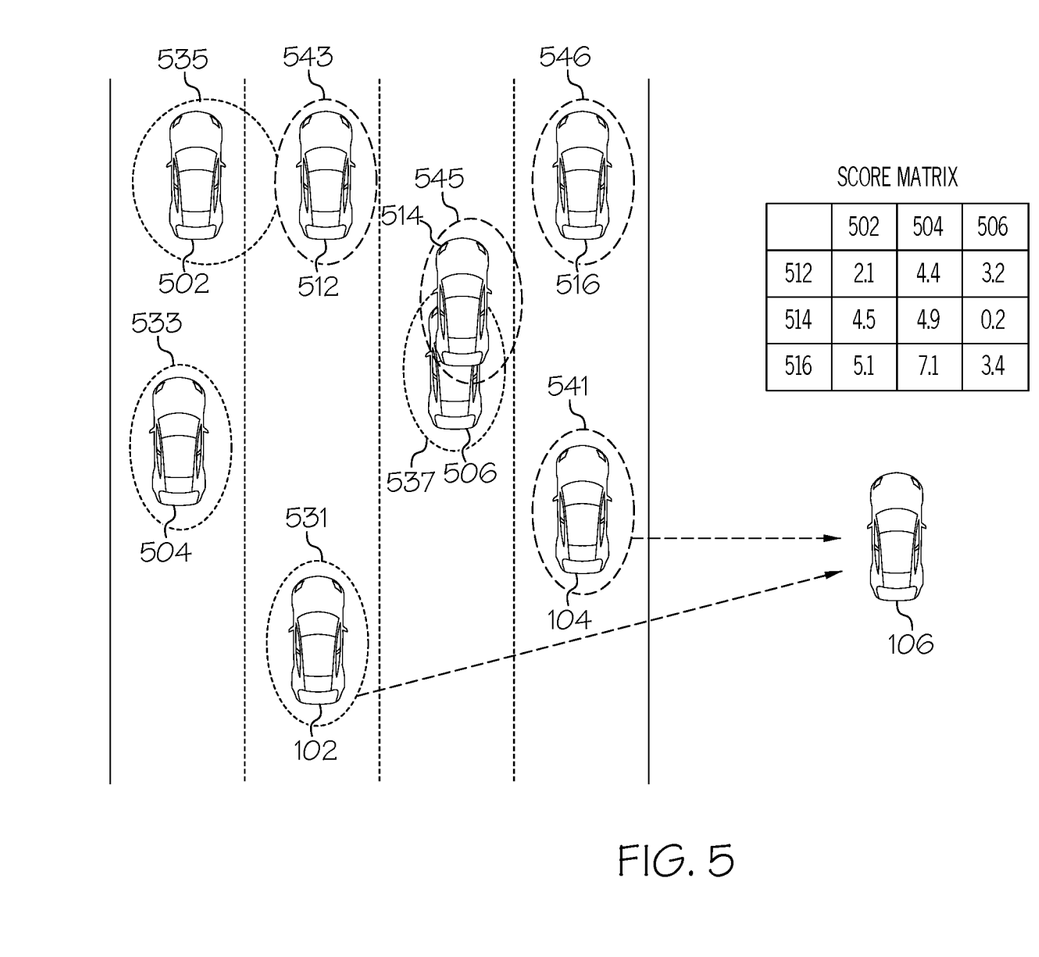
FIG. 5 depicts an example scenario where an ego vehicle identifies correspondence among objects that are included in collaborative perception messages from other vehicles, according to one or more embodiments shown and described herein.

The uncertainty of the first CPM from the vehicle 102 may include the uncertainties of the locations of the vehicle 102 and the objects 502, 504, 506 detected by the vehicle 102. Similarly, the uncertainty of the second CPM from the vehicle 104 may include the uncertainties of the locations of the vehicle 104 and the objects 512, 514, 516 detected by the vehicle 104. The location uncertainty may be defined as a scope of the location of a vehicle or a detected object. For example, the eclipses 531, 533, 535, 537 represent the uncertainties of the locations of the vehicle 102 and objects 502, 504, 506, respectively. The eclipses 541, 543, 545, 547 represent the uncertainties of the locations of the vehicle 104 and objects 512, 514, 516, respectively. The size of an eclipse increases as the uncertainty becomes greater.

In embodiments, the uncertainties of the first CPM may be represented as covariance matrices of the locations of the vehicle 102 and the objects 502, 504, 506. The uncertainties of the second CPM may be represented as covariance matrices of the locations of the vehicle 104 and the objects 512, 514, 516. In this example, the adaptive threshold may be 3.1.

Referring back to FIG. 3, in step 340, the edge node calculates scores for pairs of objects. Each of the pairs of objects includes one object in the first CPM and one object in the second CPM. By referring to FIG. 5, the vehicle 106 may generate a 3 by 3 score matrix based on the first CPM and the second CPM as illustrated in FIG. 5. The first CPM includes information about the locations of the objects 502, 504, 506 and the second CPM includes information about the locations of the objects 512, 514, 516. Each of the scores in the score matrix may represent a value proportional to a distance between a pair of objects.

The vehicle 106 may transform the first CPM into detections in the coordinates of the vehicle 106 and transform the second CPM into detections in the coordinates of the vehicle 106. Then, the vehicle 106 may calculate scores for pairs of objects that are in the coordinates of the vehicle 106. For example, the score for the pair of the objects 502 and 512 is 2.1, the score for the pair of the objects 504 and 512 is 4.4, and the score for the pair of the objects 506 and 512 is 3.2. The score for the pair of the objects 502 and 514 is 4.5, the score for the pair of the objects 504 and 514 is 4.9, and the score for the pair of the objects 506 and 514 is 0.2. The score for the pair of the objects 502 and 516 is 5.1, the score for the pair of the objects 504 and 516 is 7.1, and the score for the pair of the objects 506 and 516 is 3.4.

Referring back to FIG. 3, in step 350, the edge node filters out one or more pairs whose score is greater than the adaptive threshold to obtain a filtered matrix. By referring to FIG. 5, in this example, the adaptive threshold is determined as 3.1 in step 330. Then, the pairs whose score is greater than the adaptive threshold are filtered out to obtain a filtered matrix. Specifically, the pairs of the objects 504 and 512, the pairs of the objects 506 and 512, the pairs of the objects 502 and 514, the pairs of the objects 504 and 514, the pairs of the objects 502 and 516, the pairs of the objects 504 and 516, and the pairs of the objects 506 and 516 are filtered out. Then, the filtered matrix includes only two pairs of potential correspondence: a pair of the objects 502 and 512 and a pair of the objects 506 and 514.

Referring back to FIG. 3, in step 360, the edge node implements a fusion algorithm on the filtered matrix to obtain correspondence identification among objects. By referring to FIG. 5, the filtered matrix includes only two pairs: a pair of the objects 502 and 512 and a pair of the objects 506 and 514 as identified in step 350. Then, the vehicle 106 may implement a fusion algorithm, e.g., Hungarian algorithm, to obtain correspondence between the object 506 and the object 514, but prune correspondence between the object 502 and the object 512.

Figure 4:
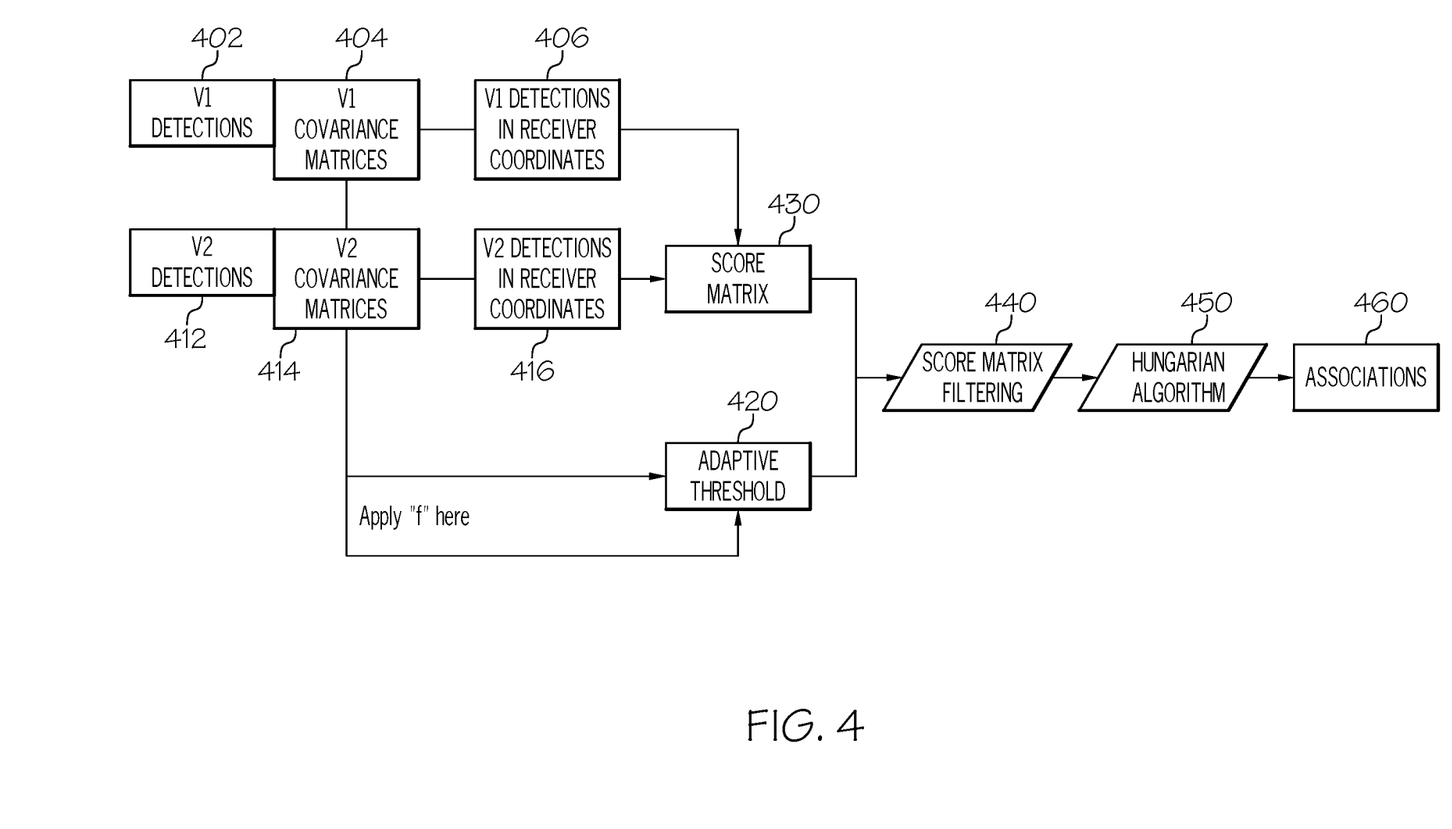
FIG. 4 depicts an overall system process implemented by an edge node, according to one or more embodiments shown and described here.

FIG. 4 depicts an overall system process implemented by an edge node, according to one or more embodiments shown and described herein. In block 402, an edge node, e.g., the vehicle 106 in FIG. 1A, receives a first CPM from a first vehicle (e.g., the vehicle 102 in FIG. 1A) that includes detections of objects. The edge node obtains covariance matrices of the locations of the first vehicle and the detected objects in block 404. In parallel to blocks 402 and 404, in block 412, the edge node receives a second CPM from a second vehicle (e.g., the vehicle 104 in FIG. 1A) that includes detections of the objects. The edge node obtains covariance matrices of the locations of the second vehicle and the detected objects in block 414. The covariance matrices obtained in block 404 and the covariance matrices obtained in block 414 are input to the mapping function f( ), and the mapping function outputs an adaptive threshold in block 420. The adaptive threshold is a threshold distance specifically tailored for the detections in blocks 402 and 412.

The edge node transforms the detections in block 402 to detections in the coordinates of the edge node in block 406. For example, the edge node calculates the relative positions of the location of the edge node and the location of the first vehicle, and transforms the coordinates of the objects in the first CPM (i.e., coordinates of the objects from the perspective of the first vehicle) to the coordinates of the objects from the perspective of the edge node based on the relative positions. Similarly, the edge node calculates the relative positions of the location of the edge node and the location of the second vehicle, and transforms the coordinates of the objects in the second CPM (i.e., coordinates of the objects from the perspective of the second vehicle) to the coordinates of the objects from the perspective of the edge node based on the relative positions.

In block 430, the edge node calculates a score matrix based on the coordinates of the objects obtained in block 406 and the coordinates of the objects obtained in block 416. Then, in block 440, the edge node filters out one or more pairs by comparing the scores in the score matrix and the adaptive threshold obtained in block 420. After the filtering out process, the edge node implements a fusion algorithm on the filtered matrix in block 450. In block 460, the edge node obtains correspondence identification among objects.

It should be understood that embodiments described herein are directed to methods and systems for matching objects in collaborative perception messages. The method includes obtaining a first collaborative perception message (CPM) from a first node, obtaining a second CPM from a second node, calculating an adaptive threshold based on uncertainty of the first CPM and uncertainty of the second CPM, calculating scores for pairs of objects, each of the pairs of objects including one object in the first CPM and one object in the second CPM, filtering out one or more pairs whose score is greater than the adaptive threshold to obtain a filtered matrix, and implementing a fusion algorithm on the filtered matrix to obtain correspondence identification among objects.

The present disclosure fully exploits current CPM structure for multiple vehicles to achieve better collaborative perception using an adaptive threshold. The adaptive threshold that is determined based on uncertainties of locations of detecting vehicles and detected objects may be used to filter out false positives of pairs of objects, and the accuracy of the correspondence identification among objects may be enhanced.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A method comprising:
   obtaining a first collaborative perception message (CPM) from a first node;
   obtaining a second CPM from a second node;
   calculating an adaptive threshold based on uncertainty of the first CPM and uncertainty of the second CPM;
   calculating scores for pairs of objects, each of the pairs of objects including one object in the first CPM and one object in the second CPM;
   filtering out one or more pairs whose score is greater than the adaptive threshold to obtain a filtered matrix; and
   implementing a fusion algorithm on the filtered matrix to obtain correspondence identification among objects.

2. The method of claim 1, wherein:
   the uncertainty of the first CPM includes uncertainty of a location of the first node; and
   the uncertainty of the second CPM includes uncertainty of a location of the second node.

3. The method of claim 2, wherein:
   each of the uncertainty of the location of the first node and the uncertainty of the location of the second node is a covariance matrix.

4. The method of claim 1, wherein:
   the uncertainty of the first CPM includes uncertainties of locations of objects detected by the first node; and
   the uncertainty of the second CPM includes uncertainties of locations of objects detected by the second node.

5. The method of claim 4, wherein:
   each of the uncertainties of locations of objects detected by the first node and the uncertainties of locations of objects detected by the second node is a covariance matrix.

6. The method of claim 1, wherein calculating the adaptive threshold comprises:
   calculating a mapping function using a machine learning algorithm; and
   calculating the adaptive threshold based on the uncertainty of the first CPM and the uncertainty of the second CPM and the mapping function.

7. The method of claim 6, further comprising
   training the mapping function using the uncertainty of the first CPM and the uncertainty of the second CPM as inputs and a comparison of a manual distance threshold as an output and a ground truth threshold; and calculating an adaptive threshold based on uncertainty of the first CPM and uncertainty of the second CPM and the trained mapping function.

8. The method of claim 6, wherein the machine learning algorithm includes one of a linear model, a logistic regression model, and a neural network model.

9. The method of claim 1, wherein each of the first node and the second node is one of a vehicle, a road side unit and an edge device.

10. The method of claim 1, wherein the fusion algorithm is a Hungarian algorithm.

11. A vehicle comprising:
a network interface configured to:
    receive a first collaborative perception message (CPM) from a first node; and
    receive a second CPM from a second node; and
a controller programmed to:
    calculate an adaptive threshold based on uncertainty of the first CPM and uncertainty of the second CPM;
    calculate scores for pairs of objects, each of the pairs of objects including one object in the first CPM and one object in the second CPM;
    filter out one or more pairs whose score is greater than the adaptive threshold to obtain a filtered matrix; and
    implement a fusion algorithm on the filtered matrix to obtain correspondence identification among objects.

12. The vehicle of claim 11, wherein:
the uncertainty of the first CPM includes uncertainty of a location of the first node;
the uncertainty of the second CPM includes uncertainty of a location of the second node; and
each of the uncertainty of the location of the first node and the uncertainty of the location of the second node is a covariance matrix.

13. The vehicle of claim 11, wherein:
the uncertainty of the first CPM includes uncertainties of locations of objects detected by the first node;
the uncertainty of the second CPM includes uncertainties of locations of objects detected by the second node; and
each of the uncertainties of locations of objects detected by the first node and the uncertainties of locations of objects detected by the second node is a covariance matrix.

14. The vehicle of claim 11, wherein the controller is further programmed to:
calculate a mapping function using a machine learning algorithm; and
calculate the adaptive threshold based on the uncertainty of the first CPM and the uncertainty of the second CPM and the mapping function.

15. The vehicle of claim 14, wherein the controller is further programmed to:
train the mapping function using the uncertainty of the first CPM and the uncertainty of the second CPM as inputs and a comparison of a manual distance threshold as an output and a ground truth threshold; and
calculate an adaptive threshold based on uncertainty of the first CPM and uncertainty of the second CPM and the trained mapping function.

16. The vehicle of claim 14, wherein the machine learning algorithm includes one of a linear model, a logistic regression model, and a neural network model.

17. The vehicle of claim 11, wherein the fusion algorithm is a Hungarian algorithm.

18. A non-transitory computer readable medium storing instructions that, when executed by a processor, perform operations comprising:
obtaining a first collaborative perception message (CPM) message from a first node;
obtaining a second CPM from a second node;
calculating an adaptive threshold based on uncertainty of the first CPM and uncertainty of the second CPM;
calculating scores for pairs of objects, each of the pairs of objects including one object in the first CPM and one object in the second CPM;
filtering out one or more pairs whose score is greater than the adaptive threshold to obtain a filtered matrix; and
implementing a fusion algorithm on the filtered matrix to obtain correspondence identification among objects.

19. The non-transitory computer readable medium of claim 18, wherein calculating the adaptive threshold comprises:
calculating a mapping function using a machine learning algorithm; and
calculating the adaptive threshold based on the uncertainty of the first CPM and the uncertainty of the second CPM and the mapping function.

20. The non-transitory computer readable medium of claim 19, where the operations further comprise:
training the mapping function using the uncertainty of the first CPM and the uncertainty of the second CPM as inputs and a comparison of a manual distance threshold as an output and a ground truth threshold; and
calculating an adaptive threshold based on uncertainty of the first CPM and uncertainty of the second CPM and the trained mapping function.

\* \* \* \* \*

UNITED STATES PATENT AND TRADEMARK OFFICE
CERTIFICATE OF CORRECTION

| | |
|---|---|
| PATENT NO. | : 11,765,562 B2 |
| APPLICATION NO. | : 17/498201 |
| DATED | : September 19, 2023 |
| INVENTOR(S) | : Hansi Liu, Hongsheng Lu and Rui Guo |

It is certified that error appears in the above-identified patent and that said Letters Patent is hereby corrected as shown below:

In the Specification

In Column 2, Line(s) 65, after "make", insert --it--.

In Column 4, Line(s) 39, after "vehicle 106.", delete "In some embodiments,".

In Column 4, Line(s) 40, before "The", insert --In some embodiments,--.

In Column 4, Line(s) 40, delete "The" and insert --the--, therefor.

In Column 8, Line(s) 45, delete "receive" and insert --receives--, therefor.

In Column 9, Line(s) 65, delete "form" and insert --from--, therefor.

In the Claims

In Column 12, Line 63, Claim 7, after "comprising", insert --:--.

Signed and Sealed this
Nineteenth Day of March, 2024

Katherine Kelly Vidal
*Director of the United States Patent and Trademark Office*